United States Patent Office 3,361,676
Patented Jan. 2, 1968

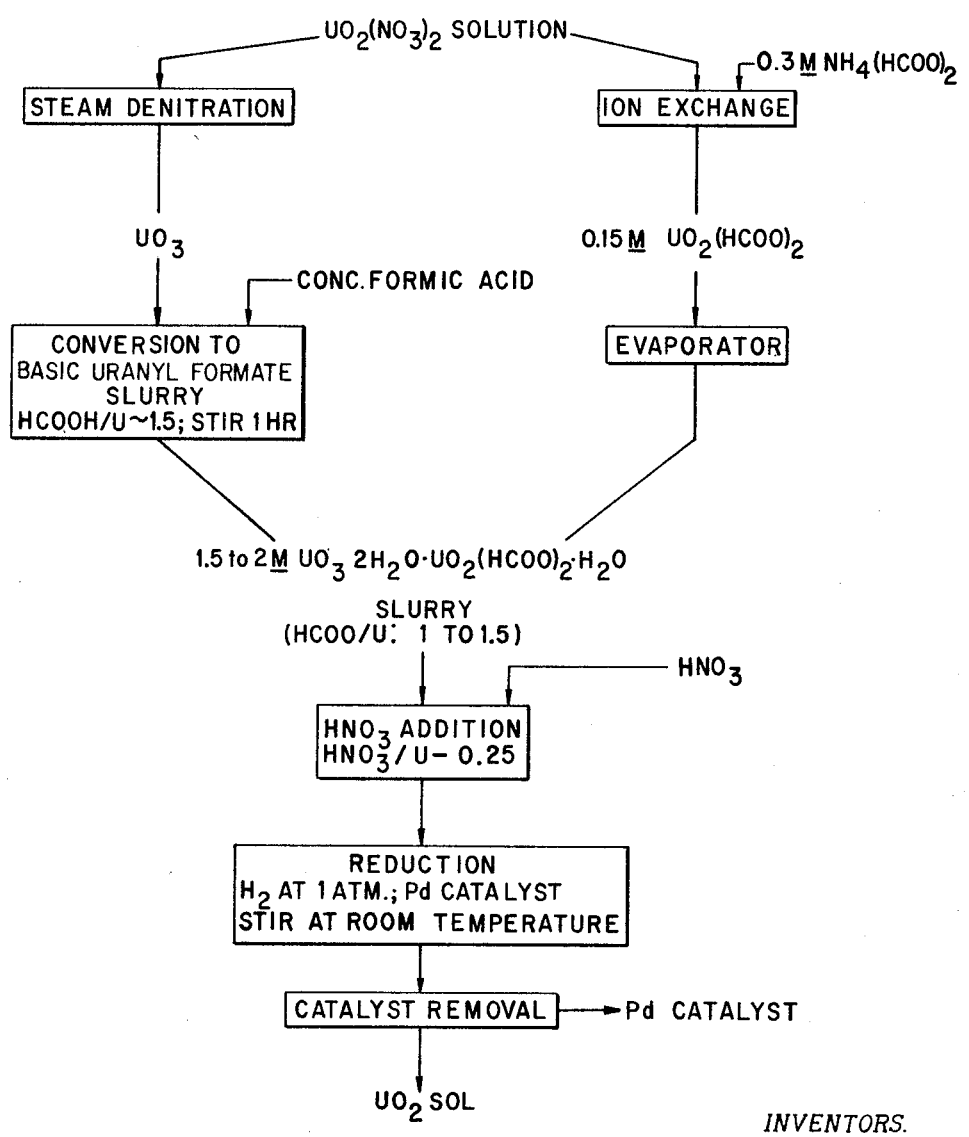

3,361,676
URANIA SOL FORMING METHOD IN THE PRESENCE OF FORMIC ACID AND A PALLADIUM-ON-THORIA CATALYST
John P. McBride, Oak Ridge, and William L. Pattison, Knoxville, Tenn., assignors to the United States of America as represented by the United States Atomic Energy Commission
Filed Feb. 10, 1967, Ser. No. 616,427
6 Claims. (Cl. 252—301.1)

ABSTRACT OF THE DISCLOSURE

An acid-deficient uranyl formate slurry in the presence of formic acid and a dispersing acid is reduced directly by hydrogen in the presence of a palladium-on-thoria catalyst to form a stable $UO_2$ sol.

BACKGROUND OF THE INVENTION

The invention described herewith was made in the course of, or under, a contract with the U.S. Atomic Energy Commission. It relates generally to a process for preparing stable aqueous sols and more particularly to the preparation of $UO_2$ sols.

Heretofore, a most attractive process, commonly referred to as the "sol-gel process," for preparing nuclear fuels has been widely established. While originally conceived as a method for preparing irregularly shaped, glass-like oxide fragments for fabrication by vibratory compaction, the fragments being formed by cracking of a hydrous oxide gel which is formed by dehydrating an aqueous sol, the technology has been extended to preparation of stable aqueous sols which could be passed into a sphere-forming column and formed into spherical droplets which are then congealed, dried, collected, and calcined to dense microspheres. Further, such processes have been extended to other actinide compounds than thorium such as uranium oxide. While this process has generally been most satisfactory, it requires a "precipitation-peptization" operation. By this it is meant that a hydrous oxide is precipitated by addition of a strong base with the precipitate being subsequently washed, filtered and peptized to a sol by addition of an electrolyte such as nitric acid. These operational steps of washing and filtering from a production standpoint pose serious difficulties and are to be avoided if possible in scaled-up processing.

As far as is ascertainable there is no priorly known process wherein uranium (VI) solid in a slurry has been reduced directly to a stable $UO_2$ sol which is suitable for processing into either dense fragments for vibratory compaction or dense fired microspheres. Earlier work by G. Cogliati et al., presented at the 3rd United Nations International Geneva Conference on the Peaceful Uses of Atomic Energy, May 1964, Volume II, 28/P/555, demonstrated that a concentrated acid deficient uranium (VI) nitrate solution could be hydrogenated catalytically to reduce the uranium(VI) to uranium (IV) directly, using a hydrogen pressure of 40 kg./cm.² and a catalyst of 5% platinum on alumina, thereby forming a uranium (IV) colloidal solution which could, upon removing excess nitrate by amine extraction, be processed into fired spherical particles. While this process obviates the hereinbefore described "precipitation-peptization" operation, it requires a solvent extraction to provide an acid deficient uranyl nitrate solution and a tedius nitrate removal step to reduce the nitrate/uranium molar ratio, which is too high for subsequent processing into fired microspheres, below about 0.05, prior to forming the colloidal solution into gel particles. Moreover, while this process is suitable for preparing spherical particles, the colloidal solution, owing to the high nitrate concentration which would at elevated temperatures oxidize the uranium (IV) to a higher oxidation state, cannot be dehydrated by evaporation to gel fragments as is found with the sol-gel process. Upon drying the colloidal solution forms $UO_3$ powder, which is wholly unsuitable for vibratory compaction, instead of $UO_2$ gel fragments.

SUMMARY OF INVENTION

The objects and advantages of this invention are realized by the discovery that an acid deficient uranyl formate slurry containing approximately half the amount, i.e., one mole formate per mole uranium, of formate required for stoichiometric uranyl formate in the presence of formic acid and a dispersing acid could be hydrogenated catalytically using hydrogen in the presence of a palladium-on-thoria catalyst to produce a stable $UO_2$ sol. By the term "dispersing acid" it is meant herein acids such as nitric, hydrochloric, etc. This stable $UO_2$ sol, in turn, can be evaporated by drying at temperatures, such as 100° C., to form gel fragments which can be fired and employed in fabricating fuel rods by vibratory compaction. Alternately, the stable $UO_2$ sol can be passed into a sphere-forming column containing an organic drying liquid, such as 2-ethylhexanol, to form spherical particles which can subsequently be processed into dense fired microspheres for reactor use.

BRIEF DESCRIPTION OF THE DRAWING

The sole drawing details alternate routes for preparation of stable $UO_2$ sols. In a first method a uranyl nitrate solution is denitrated to provide $UO_3 \cdot H_2O$ solid and the $UO_3 \cdot H_2O$ solid is converted to an acid-deficient uranyl formate slurry, hereinafter referred to as a uranium (VI) slurry, by adding concentrated formic acid, providing a formate/uranium molar ratio of about 1.5 and stirring for approximately 1 hour. Nitric acid is next added to the uranium (VI) slurry to provide a nitrate/uranium molar ratio of 0.25 and the slurry reduced with hydrogen in the presence of palladium-on-thoria catalyst. The catalyst is then removed to provide the stable $UO_2$ sol. In an alternate method the uranyl nitrate solution is passed into an ion exchange column, adsorbing the uranium on the cation resin material. The uranium is eluted with an ammonium formate solution and the resulting uranyl formate solution is concentrated forming a uranium (VI) slurry. The slurry is then treated as in the first method to form a stable $UO_2$ sol.

DESCRIPTION

In practice the exact mode by which the uranium (VI) slurry is provided is not critical. In one method (not shown in drawing) $UO_3 \cdot H_2O$ (solid) is added directly to a well-stirred nitric acid-formic acid solution to produce the uranium (VI) slurry. In a preferred method

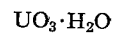

which may conveniently be provided by steam denitration of a uranyl nitrate solution, is added, with stirring, into a formic acid solution and thus metathesized to the acid-deficient uranyl formate prior to nitric acid addition. In still another method, uranium may be adsorbed on a cation exchange resin from a solution, such as uranyl nitrate, and eluted with ammonium formate to form a uranyl formate solution. The formate solution may then be concentrated by boiling to yield the uranium (VI) slurry.

It should be appreciated that, unlike the priorly known work employing concentrated uranyl nitrate solutions, the present invention is directed to forming a uranium (VI) slurry in a dilute mixed acid solution. Applicants have found that the successful preparation of stable $UO_2$ sols is concentration dependent. Stable $UO_2$ sols by the method of this invention can readily be prepared from uranium (VI) slurries 1 to 2 molar in uranium, preferably having a formate/uranium molar ratio of 1 to 1.5 and a nitrate/uranium molar ratio of 0.2–0.25. In general, slurries 1 to 2 molar in uranium provide $UO_2$ sols of about the same concentrations. Where the uranium concentration in the slurry is 0.15 molar or less, stable $UO_2$ sols could not be produced by this direct reduction operation even at acid/uranium ratios which are optimum for more concentrated uranium slurries. While sols may be prepared at relatively high acid/uranium mole ratios, mole ratios of acid/uranium much higher than the upper limits of the preferred ratio make subsequent preparation of fragments and microspheres from the sols more difficult.

The presence of both formate and dispersant ions in dilute concentrations, preferably provided as formic acid and a dispersing acid such as nitric acid, respectively, is critical to the practice of the invention. Where solid $UO_3 \cdot H_2O$ was slurried with a dilute nitric acid solution, the uranium (VI) while being reduced to uranium (IV), precipitated out instead of forming a sol. Moreover, where solid $UO_3 \cdot H_2O$ was added to dilute formic acid solution, and catalytically reduced, the resulting $UO_2$ sols were not as satisfactory as those prepared in the presence of a dispersing acid because of their tendency to thicken and gel or to form gel-like sediments.

The reduction of the uranium (VI) slurry to a $UO_2$ sol is effected by bubbling hydrogen through the slurry at atmospheric pressure in the presence of a catalyst. The flow rate at which hydrogen is passed through the slurry is not critical and for laboratory scale runs flow rates of between 100–150 cc./minute have been quite satisfactory. After reduction the catalyst and undispersed uranium are removed by sedimentation and the sol recovered by decantation.

The catalyst is palladium-on-thoria and is added in aliquots to the uranium (VI) slurry as a flocculated suspension. A detail description of a method for preparing this catalyst is found in U.S. Patent 3,023,085 issued to John P. McBride on Feb. 28, 1962, for "Method of Combining Hydrogen and Oxygen." Briefly, this method comprises refluxing thorium oxide, which is prepared by calcination of thorium oxalate, in an aqueous solution containing palladium nitrate at a concentration of at least 0.05 gram per gram of thorium oxide to form a sol. Gaseous hydrogen is then passed into the sol to form the flocculated suspension. The concentration of the catalyst is not critical and is preferably added in the amounts of 15–30 mg. of palladium-on-$ThO_2$ catalyst per gram $UO_2$, having a palladium/thorium ratio of 0.02.

Due to the heats of reaction during the reduction step, the temperature of the solution is raised slightly above room temperature. While temperature rises of 10°–20° C. were experienced for 120 grams of uranium, this exothermic condition poses no real problem for scale-up operations.

Advantageously, the present method is uniquely suited for incorporation into an on-site fuel cycle facility wherein, for example, spent $UO_2$, tubular clad fuel elements are discharged from a reactor, mechanically processed for dissolution, chemically processed by solvent extraction to remove fission products, and finally refabricated for loading into a reactor. In accordance with such a scheme (see drawing) a uranyl nitrate solution is passed through an ion exchange column containing a cation exchange material, such as Dowex–50, in the ammonium form and the adsorbed uranium is eluted with an ammonium formate solution, providing a uranyl formate solution. The solution is concentrated by evaporation, forming a uranium (VI) slurry in dilute formic acid. Nitric acid is next added to provide an optimum nitrate/uranium ratio of 0.25 and the slurry reduced by hydrogen in the presence of a palladium-on-thoria catalyst to form $UO_2$ sol. After the catalyst is removed, the $UO_2$ sol can be processed either into gel fragments by evaporation or into microspheres by gelation in a sphere-forming column.

The present invention will be further explained by the following illustrative but non-limiting examples.

*Example I*

Three uranium (VI) slurries were prepared by adding 120 grams of uranium as $UO_3 \cdot H_2O$ directly to 250 mls. of a well-stirred nitric acid-formic acid solution in respective baffled flasks. The initial uranium concentration was 2 M and the initial nitrate/uranium and formate/uranium ratios were 0.2 and 1.0, respectively, for each flask. Twenty (20) mls. of a flocculated suspension of palladium-on-thoria catalyst (70 mgs. Pd) was added to the respective slurries and hydrogen at a flow rate of 150 cc./minute was bubbled through a gas diffuser tube to reduce the uranium (VI) to uranium (IV), forming a $UO_2$ sol. The sols were centrifuged on an International size 2 centrifuge at 1300 r.p.m. to remove the catalyst and undispersed uranium and the sols recovered by decantation. The final sols were stable, showing no significant change in physical properties or separation of solids after several months' storage under an inert atmosphere.

To evaluate the effect of heat treatment during the reduction step, hydrogen flow was continued in two of the runs for about 2 hours longer with the sol being maintained at 60–65° C. No appreciable improvement was observed in the yield with the heat treatment.

Analysis of the $UO_2$ sols indicated uranium concentrations varying from 1.6 to 1.8 M and final nitrate/uranium and formate/uranium ratios varying from 0.13 to 0.25 and 0.47 to 0.72, respectively. Better than 90% of the uranium present was uranium (IV). The results of these runs (numbered 1–3) are shown in the table below.

*Example II*

Two uranium (VI) slurries were prepared as follows: to each of two flasks 500 grams of uranium $UO_3 \cdot H_2O$ was added to 1500 mls. of water, concentrated formic acid added to give a formate/uranium molar ratio of 1.5 and the solution stirred one hour to form a uranium (VI) slurry by metathesize of the $UO_3$. Nitric acid was added to the solution to provide a nitrate/uranium ratio of 0.15. Since the nitric acid first added was not optimum, additional nitric acid was added to provide a nitrate/uranium molar ratio of 0.25.

The uranium (VI) slurry was then reduced with hydrogen at room temperature and one atmosphere pressure in the presence of a palladium-on-thoria catalyst to form a $UO_2$ sol. As in Example I the sols were recovered by centrifugation and, similarly, exhibited good stability upon standing for several months.

Analysis of the $UO_2$ sols indicated uranium concentrations of 1.4 and 1.6 M and final nitrate/uranium and formate/uranium ratios of 0.22 and 0.23 and 1.2 and 0.8, respectively. Better than 92 percent of the uranium present was uranium (IV). The results of these runs (numbered 4 and 5) are shown in the table below.

*Example III*

A uranium (VI) slurry was prepared as in Example II, except 300 grams of uranium as $UO_3 \cdot H_2O$ was added to 900 mls. of water. The slurry was reduced with hydrogen (150 cc./minute for 18 hours) in the presence of a palladium-on-thoria catalyst forming a $UO_2$ sol. The sol was heated to a temperature between 50–70° C. and hydrogen bubbled through for an additional 4 hours. The high yield of sol probably reflects the use of the optimum nitrate/uranium ratio in the preparation rather than any effect of heat treatment during reduction (see table below). The resulting $UO_2$ sol exhibited good stability upon standing for several months.

Analysis of the $UO_2$ sol indicated a uranium concentration of 1.3 M and final nitrate/uranium and formate/ uranium ratios of 0.25 and 0.65. The size of the $UO_2$ crystallite, as determined by X-ray line broadening, was about 38 Angstroms. Better than 99 percent of the uranium present was uranium (IV). The results of this run (numbered 6) are shown in the table below.

*Example IV*

To demonstrate the feasibility of preparing the uranium (VI) slurry by ion exchange techniques two runs were made as follows: a 1 M uranyl nitrate solution was passed upward through a cation exchange resin column packed with Dowex–50 resin in the ammonium form (×8, 50–100 mesh). The column was then washed with several column volumes of water to remove the ammonium nitrate and the uranium was eluted with 0.3 M ammonium formate solution flowing down the column to give a 0.15 M uranyl formate solution.

In each experiment the uranyl formate solution was concentrated by boiling to yield 250 mls. each of a uranium (VI) slurry containing 1.4 and 1.9 gram-molecular weights of uranium per liter, respectively. Nitric acid was added to give nitrate/uranium ratios of 0.23 and 0.15, respectively. As provided in Example II, additional nitric acid was added in the latter experiment to bring the nitrate/uranium ratio of 0.15 up to an optimum ratio. Ten (10) mls. of palladium-on-ThO₂ catalyst was added to each slurry and the slurries reduced with hydrogen (150 cc./minute) to form $UO_2$ sols which as in the above examples exhibited good stability upon standing several months. In one experiment the sol was heated to a temperature between 50–70° C. and hydrogen bubbled through for an additional hour. As in Example III the high yield of sol is probably associated with the use of the optimum nitrate/uranium ratio rather than the heat treatment during reduction.

Analysis of the $UO_2$ sols indicated a uranium concentration of 1.3 to 1.8, respectively, and final nitrate/uranium ratios of 0.23 to 0.32 and in the latter preparation a formate/uranium ratio of 1.03. The uranium (IV) concentrations in the sols were 99 and 91 percent, respectively. The results of these runs (numbered 7 and 8) are shown in the table below.

*Example V*

A $UO_2$ sol prepared in Example IV (run 7) was processed into dense, fired $UO_2$ gel fragments 1 to 2 mm. in size, by drying in argon at 100° C. and firing in Ar-4% H₂ at 1100° C. for 3½ hrs. The shards had a Hg density at 1500 p.s.i. of 10.8 g./cm.³, a 1 atm. porosity of <1%, and a krypton adsorption surface area of 0.016 m.²/g. Crystallite size as measured by X-ray diffraction was 1750 A. and carbon content was 160 p.p.m. A polished cross section of 500 × magnification showed only microporosity and had an average Knoop hardness of 821.

*Example VI*

A $UO_2$ sol prepared as in Example I was processed into dense, fired $UO_2$ microspheres, 150 to 175 microns in diameter. The sol was dispersed into droplets in a drying solvent, 2-ethylhexanol, containing surfactants to form gel microspheres. The gel microspheres were dried in argon at 100 to 150° C. and then fired for 4 hours in H₂ at 1500° C. The fired microspheres had an average crushing strength of 1120 g. (10 spheres).

TABLE

| Run | Total Uranium (g.) | Initial Uranium Conc. (M) | Initial NO₃/U Ratio | Initial HCOO/U Ratio | H₂ Treatment ||| Yield (percent) | Sol Properties ||||
|---|---|---|---|---|---|---|---|---|---|---|---|---|
| | | | | | Time at 30–40° C. (hr.) | Heat Treatment || | Uranium Conc. (M) | U (IV) Content, percent of U | NO₃/U Ratio | HCOO+/U Ratio |
| | | | | | | Time (hr.) | Temp. (° C.) | | | | | |
| 1 | 120 | 2.0 | 0.2 | 1.0 | 20 | 3 | 60 | 94 | 1.8 | 92 | 0.13 | 0.72 |
| 2 | 120 | 2.0 | 0.2 | 1.0 | 20 | 2 | 60–65 | 93 | 1.6 | 90 | 0.25 | 0.55 |
| 3 | 120 | 2.0 | 0.2 | 1.0 | 24 | | | 95 | 1.8 | 93 | 0.20 | 0.47 |
| 4 | 500 | 1.5 | 0.15 | 2.0 | 7 | | | | 1.4 | 94 | 0.22 | 1.23 |
| 5 | 500 | 1.7 | 0.15 | 1.5 | 6 | | | | 1.6 | 92 | 0.23 | 0.81 |
| 6 | 300 | 1.4 | 0.25 | 2.0 | 18 | 4 | 50–70 | 90 | 1.3 | 99 | 0.25 | 0.65 |
| 7 | 80 | 1.9 | 0.15 | 1.1 | 18 | | | 96 | 1.8 | 91 | 0.32 | 1.03 |
| 8 | 83 | 1.4 | 0.25 | 1.2 | 1 | 1 | 50–70 | 96 | 1.3 | 99 | 0.23 | |

What is claimed is:

1. A method for preparing stable $UO_2$ sols comprising the steps of forming an acid-deficient uranyl formate slurry in the presence of formic acid and a dispersant acid, said slurry containing one mole formate per mole uranium, reducing the uranium (VI) to uranium (IV) by bubbling hydrogen in the presence of a palladium-on-thoria catalyst through said slurry thereby forming said stable $UO_2$ sols and thereafter removing said catalyst.

2. The method of claim 1 wherein said acid-deficient uranyl formate slurry is prepared by slurrying $UO_3 \cdot H_2O$ solid with formic acid and nitric acid.

3. The method of claim 2 wherein said acid-deficient uranyl formate slurry has a formate/uranium ratio of 1.0–1.5 and a nitrate/uranium ratio of about 0.25.

4. The method of claim 1 wherein said reduction step is carried out at about room temperature and one atmosphere pressure.

5. The method of claim 1 wherein said acid-deficient uranyl formate slurry is prepared by adsorbing uranium from a uranyl nitrate solution on a cation exchange resin, eluting said uranium with an ammonium formate solution, concentrating the resulting uranyl formate solution forming said acid-deficient uranyl formate slurry in formic acid and thereafter adding nitric acid to said slurry.

6. The method of claim 5 wherein said acid-deficient uranyl formate slurry has a formate/uranium ratio of 1.0 to 1.5 and a nitrate/uranium ratio of about 0.25.

References Cited

UNITED STATES PATENTS

| | | | |
|---|---|---|---|
| 3,024,199 | 3/1962 | Pasfield. | |
| 3,312,628 | 4/1967 | Smith | 252—301.1 |
| 3,312,629 | 4/1967 | Smith | 252—301.1 |
| 3,312,633 | 4/1967 | Smith | 252—301.1 |
| 3,317,432 | 5/1967 | Alexander | 252—301.1 |

BENJAMIN R. PADGETT, *Primary Examiner.*

S. J. LECHERT, JR., *Assistant Examiner.*